March 13, 1934. C. C. RUPERTUS Re. 19,109

SKYLIGHT JOINT

Original Filed March 28, 1931

Inventor

Chester C. Rupertus,

By Geo. P. Kimmel.

Attorney

Reissued Mar. 13, 1934

Re. 19,109

UNITED STATES PATENT OFFICE 19,109

SKYLIGHT JOINT

Chester C. Rupertus, Washington, D. C.

Original No. 1,873,789, dated August 23, 1932, Serial No. 525,978, March 28, 1931. Application for reissue October 3, 1932, Serial No. 636,089

14 Claims. (Cl. 108—16)

This invention relates to improvements in skylight joints and has for its primary object to provide, in a manner as hereinafter set forth, a skylight joint by means of which opposing skylight sections may be resiliently supported and effectively connected together in a manner to exclude dust, moisture and the like and to permit a free circulation of air between the supporting bars and the glass plates to eliminate condensation forming on the supporting bars and glass plates.

A further object of the invention is to provide a skylight joint of the character aforesaid which will not deteriorate with age or long continued use under any and all atmospheric conditions such as existing in chemical plants or plants located near salt water or other adverse atmospheric conditions.

The fundamental purpose of my invention is to provide a non-deteriorating, resilient skylight or glazed joint in which the cushion for the glass plates is formed of a non-corrosive resilient metallic wool which performs three functions, namely: first, of an elastic cushion for compensating for expansion and contraction between the glass plates and supporting structure; second, to allow free circulation of air to eliminate condensation; and third, to form a filter to exclude dust, dirt and moisture.

This construction eliminates all of the disadvantages existing in prior constructions in skylight and glazed structures, such as the use of springs and the like and a cushion is provided in which the cushion not only acts as a cushioning member but performs the function of a spring in resiliently holding the supporting structure and glass plates in a sealed contact with one another.

I am aware that prior to my invention that it was old to use cushions formed of various kinds of material, such as lead wool, felt, asphalt, rubber or cork, but these materials will not withstand the atmospheric conditions to which a skylight or glazed structure is subjected and soon deteriorate and do not perform the same function of applicant's cushion, as, for example, lead wool packs under pressure to such an extent that it has no resiliency and it fails to expand to keep a tight joint and does not have the filtering characteristic of applicant's cushion to allow air to circulate and yet prevent dirt, dust and moisture from passing therethrough.

Felts of various kinds soon deteriorate and do not have the resiliency and air circulating characteristics of applicant's cushion and are used in connection with spring devices for maintaining the supporting structure and glass panels under tension.

Asphalt while pliable is not resilient and porous and fails to expand after being compressed, thereby failing to allow air to circulate therethrough.

Rubber while originally resilient soon deteriorates and becomes hard and never has the air circulating and filtering characteristics of applicant's cushion.

Cork while somewhat elastic never has the filtering and air circulating features and soon deteriorates under certain atmospheric conditions while with applicant's construction of cushion as above described, all the above disadvantages are eliminated and applicant combines in a single cushioning element, resilient porous means for connecting the glass plates to the supports so as to overcome the disadvantages of prior constructions and yet accomplish the desired result.

With the foregoing and other objects in view, the invention consists of the novel construction, combination and arrangement of parts as hereinafter more particularly described, and illustrated in the accompanying drawing, but it is to be understood that the description and drawing are to be considered as illustrative rather than limitative.

While I have shown and described a joint used in connection with skylights, I am aware that my joint can be used in connection with any glazed structure and therefore I do not desire to limit myself to any particular use for the same.

In the accompanying drawing in which like numerals are employed to designate like parts throughout the several views.

Figure 1:
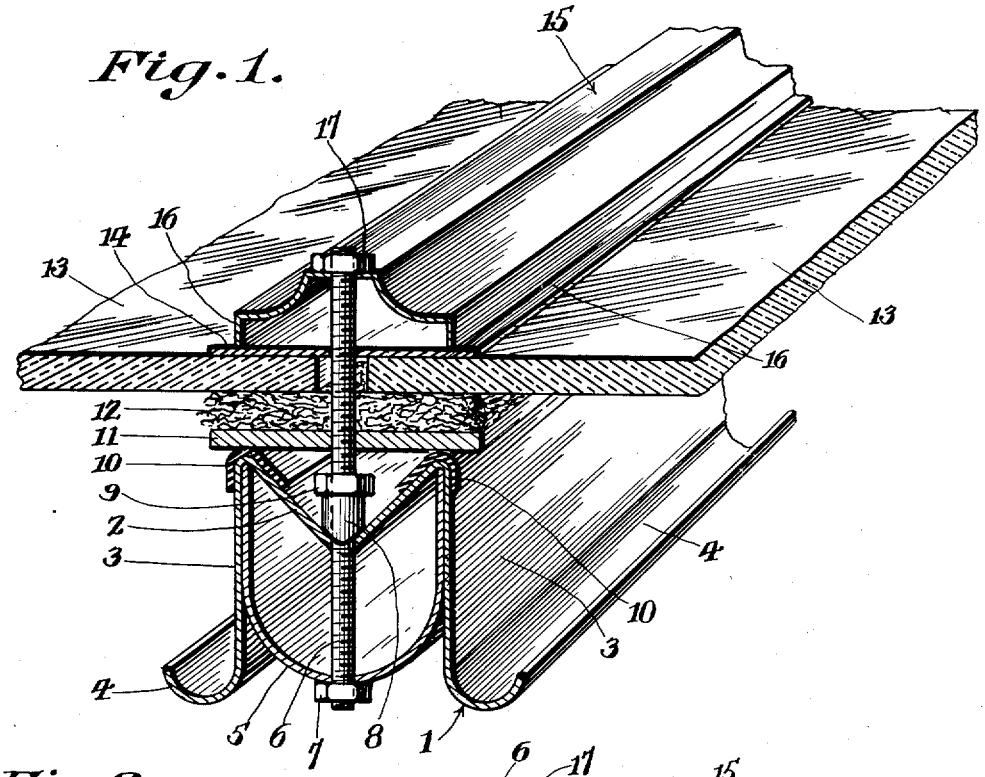
Figure 1 is a sectional perspective showing a skylight joint in accordance with this invention in applied position.
Figure 2:
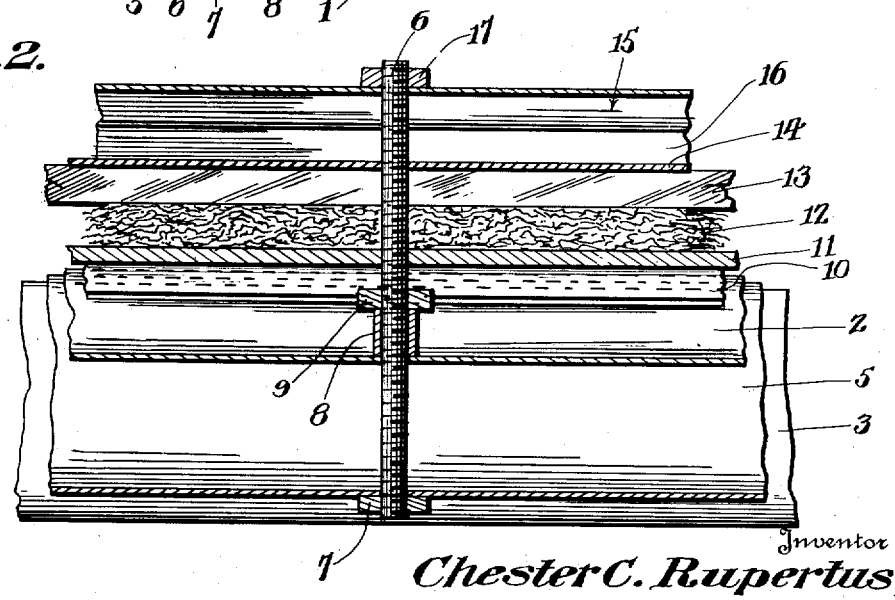
Figure 2 is a fragmentary longitudinal section through the joint in its applied position.

Referring to the drawing in detail, the numeral 1 indicates generally a supporting member including a central portion 2 which is substantially V-shape in cross section and further including a pair of leg portions 3 depending from the central portion 2 and having free longitudinal edge portions thereof upturned to provide gutters 4. Disposed between the leg portions 3 of the member 1 is an elongated member 5 substantially U-shape in cross section and having its free longitudinal edges bearing against the lower faces of the lines of joinder between the central portion 2 and leg portions 3 of the member 1. Extending through vertically aligned openings in the member 5 and central portion 2 is a threaded bolt 6 having a nut 7 threaded on the lower end thereof and bearing against the lower face of the member 5. Loosely encircling the bolt 6 is a sleeve 8, the lower end of which is bevelled in opposite directions to firmly seat against the upper face of the central portion 2, midway between the side extremities of the latter. The free longitudinal edges of the member 5 may be drawn tightly against the lower faces of the lines of joinder between the portions 2 and 3 of the member 1 by means of a nut 9 which is threaded on the bolt 6 and bears against the upper end of the sleeve 8.

Seated on the upper faces of the lines of joinder between the portions 2 and 3 of the member 1 are a pair of elongated, transversely curved strips 10 formed from a relatively soft metal such as lead. The lower faces of the strips 10 are curved in such a manner that they will lie flat against adjacent portions of the portions 2 and 3 of the member 1. Seated on the strips 10 and projecting laterally therefrom is an elongated plate 11 formed from a non-corrosive material, preferably brass or copper. Disposed upon the plate 11 and extending throughout the entire area thereof is a combined cushion and filter 12 of non-corrosive, resilient metal wool, preferably brass or copper. The combined cushion and filter 12 is adapted to have seated thereon opposing sections 13 of a skylight or the like with the opposing edges of the sections 13 in spaced relation as clearly shown in Figure 1. Seated on adjacent portions of the sections 13 is an elongated plate 14 preferably formed of the same material as the elongated strips 10. The plate 14 preferably corresponds in length and width to the plate 11.

Extending throughout the length of the plate 14 is a crown member 15 having vertically disposed side walls 16 seated on the plate 14 in spaced relation to the side edges of the latter. The bolt 6 extends through suitable openings in the plates 11 and 14 and crown member 15 in vertical alignment with the openings through the member 5 and central portion 2 of the member 1. Threaded on the upper end of the bolt 6 is a nut 17 which may be tightened to press the lower edges of the side walls 16 into firm engagement with the plate 14, and to press the cushion and filter 12 between the sections 13 and plate 11.

The resilient characteristic of the element 12 permits the exertion of a relatively high pressure by the nut 17 without damage to the sections 13, and the filtering characteristic of the element 12 absorbs any dust, moisture or the like which may seep through the space between the sections 13 in the use of the joint. The adjustment of the nut 17 is such that the element 12 will be compressed sufficiently to form an effective seal between the plate 11 and sections 13 and still provide a resilient support for the latter. The gutters 4 formed at the lower edges of the leg portions 3 of the member 1 will collect any moisture that is formed on the lower faces of the sections 13 by condensation or the like. The crown member 15 is formed from a non-corrosive material, preferably brass or copper, in order to prevent any formation of rust due to the exposure of this member to the weather.

It is thought that the many advantages of a skylight joint in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. A skylight joint comprising, a supporting structure for spaced adjacent portions of a pair of skylight sections and including an elongated supporting plate at the top thereof, a combined cushion and filter element interposed between the said plate and said adjacent portions, a crown structure disposed above said adjacent portions, and clamping means extending between said sections and through said supporting and crown structures for securing the latter together, said crown structure including an elongated soft metal plate seated on and bridging the space between said adjacent portions and further including an inverted elongated channel member having side walls disposed at a right angle to and seated on said soft metal plate.

2. A skylight joint comprising, a supporting structure for spaced adjacent portions of a pair of skylight sections and including an elongated supporting plate at the top thereof, a combined cushion and filter element interposed between the said plate and said adjacent portions and including a plate seated on and bridging the space between said portions, a crown structure disposed above said adjacent portions, and clamping means extending between said sections and through said supporting and crown structures for securing the latter together, said supporting structure including an elongated member having a central portion substantially V-shape in cross section and further having a pair of leg portions depending from said central portion, said supporting structure further including an elongated member substantially U-shape in cross section disposed beneath said central portion and having its free longitudinal edges abutting the lower faces of the lines of joinder between said central portion and leg portions and strips overlapping said longitudinal edge and bearing against the said supporting plate.

3. A skylight joint comprising, a supporting structure for spaced adjacent portions of a pair of skylight sections and including an elongated supporting plate at the top thereof, a combined cushion and filter element interposed between the said plate and said adjacent portions and including a plate seated on and bridging the space between said portions, a crown structure disposed above said adjacent portions, and clamping means extending between said sections and through said supporting and crown structures for securing the latter together, said supporting structure including an elongated member having a central portion substantially V-shape in cross section and further having a pair of leg portions depending from said central portion, said supporting structure further including an elongated member substantially U-shape in cross section disposed beneath said central portion and having its free longitudinal edges abutting the lower faces of the lines of joinder between said central portion and leg portions and strips overlapping said longitudinal edges and bearing against the said supporting plate, said clamping means including a bolt extending through said V-shaped portion and U-shaped member, a sleeve loosely encircling the bolt and bearing against the upper face of said V-shaped portion, and a pair of nuts threaded on opposite ends of the bolt and respectively bearing against the lower face of said U-shaped member and the upper face of said sleeve.

4. A skylight joint comprising, a supporting structure for spaced adjacent portions of a pair of skylight sections including an elongated supporting plate at the top thereof, a combined cushion and filter element interposed between the said plate and said adjacent portions and including a plate seated on and bridging the space between said portions, a crown structure disposed above said adjacent portions, and clamping means extending between said sections and through said supporting and crown structures for securing the latter together, said supporting structure including an elongated element of angular construction in cross section and, a pair of soft metal strips seated on the elongated element, extending longitudinally of the latter and bearing against said supporting plate.

5. A skylight joint comprising, a supporting structure for spaced adjacent portions of a pair of skylight sections and including at its upper part parallel, spaced strips of soft metal and a supporting plate of soft metal seated on the strips, a combined cushion and filter element formed of non-corrosive, resilient, metallic wool disposed throughout the upper face of said plate and interposed between the latter and said portions, a crown structure disposed above and including a soft metal plate seated on and bridging the space between said portions, and a clamping device for and extending through said structures and between said plates.

6. A skylight joint comprising, a supporting structure for spaced adjacent portions of a pair of skylight sections and including at its upper part parallel, spaced strips of soft metal and a supporting plate of soft metal seated on the strips, a combined cushion and filter element formed of non-corrosive, resilient, metallic wool disposed throughout the upper face of said plate and interposed between the latter and said portions, a crown structure disposed above and including a soft metal plate seated on and bridging the space between said portions, a clamping device for and extending through said structures and between said plates, and said supporting means including a pair of sections, one enclosing and extending into the other, said clamping device provided intermediate its ends with means for clamping said sections together to prevent movement relatively to each other, said means being located below said supporting plate.

7. In a skylight or glazed structure, supports, cushions resting on said supports, glass plates resting on said cushions, means for clamping said plates on said cushions, said cushions being formed of resilient, non-corrosive metallic wool for holding the elements of said structure in contact with one another under tension and to allow for expansion and contraction between said supports and said clamping means and to permit a free circulation of air and yet exclude dirt and dust from passing between said supports and said clamping means.

8. A skylight joint comprising a supporting structure for spaced adjacent portions of a pair of skylight sections, a supporting plate of soft metal seated upon said support, a resilient, combined cushion tensioning and filtering element formed of resilient, non-corrosive metallic wool disposed on said plate and interposed between the latter and said portions, a crown structure disposed above said portions bridging the space between said portions and a clamping device extending through said structures between said skylight sections.

9. A skylight or glazed structure comprising a support including a portion of soft metal, a resilient, porous cushion seated on the portion of soft metal formed of resilient, non-corrosive metallic wool, glass plates seated on said cushion, a crown portion includng a porton of soft metal engaging said glass plates, means connecting said crown to said support for clamping said plates between said support and crown member, said cushion forming means for allowing a free circulation of air between said supports and plates and for excluding dirt, dust and moisture from passing between said plates and supports, said cushion resiliently holding said members in contact with one another under tension.

10. A skylight or glazed structure comprising a support, a resilient, porous cushion arranged on said support formed of non-corrosive, resilient metallic wool, glass plates mounted on said cushion, a crown structure including a soft metal portion engaging said glass plates, means for connecting said crown structure to said support for clamping said plates on said cushion, said cushion forming means for holding said members together under tension and allowing a free circulation of air between said supports and glass plates for preventing condensation and forming a filter for preventing dirt and dust from passing between said glass plates and said support.

11. A structure of the kind described comprising a support, a resilient, porous cushion in engagement with said support formed of non-corrosive, resilient metallic wool, glass plates engaging said cushion, a member engaging said plates, means connecting said member to said support for securing said plates on said cushion, said cushion forming means for holding said members together under tension and for allowing a circulation of air between said supports and glass plates and for filtering the air passing therethrough for excluding dirt and dust from passing between said glass plates and support.

12. A structure of the kind described comprising spaced members, glass plates disposed between said members and a porous, resilient cushioning means formed of highly resilient non-corrosive metallic wool disposed between said glass plates and one of said members to hold the elements of said structure in contact with one another under tension.

13. A structure of the kind described comprising spaced members having a glass plates disposed between said members, means for connecting said members together and a porous cushioning element formed of a resilient non-corrosive metallic wool disposed between said members to form a resilient support for said glass plates and to hold said members together under tension and to allow air to circulate therethrough and exclude dirt and dust from passing therethrough.

14. A structure of the kind described comprising spaced members, glass plates disposed between said members, means for connecting said members together and a porous, resilient cushioning element formed of highly resilient, non-corrosive metallic wool disposed between said glass plates and one of said members for holding the elements of said structure in contact with one another under tension and to allow a circulation of air to prevent condensation and to exclude dirt, dust and moisture.

CHESTER C. RUPERTUS